United States Patent [19]
Tanimoto et al.

[11] Patent Number: 5,907,344
[45] Date of Patent: May 25, 1999

[54] IMAGE FORMING APPARATUS WITH IMAGE TONE ADJUSTING FUNCTION

[75] Inventors: Takeshi Tanimoto; Youji Houki; Tsutomu Nagatomi; Hirofumi Nakayasu; Masakazu Kinoshita, all of Kawasaki, Japan

[73] Assignee: Fujitsu Limited, Kawasaki, Japan

[21] Appl. No.: 09/076,705

[22] Filed: May 13, 1998

[30] Foreign Application Priority Data

Nov. 19, 1997 [JP] Japan ...................................... 9-318333

[51] Int. Cl.⁶ ............................ G03G 15/00; G03G 15/01
[52] U.S. Cl. .......................... 347/131; 347/240; 347/251; 358/298; 399/49
[58] Field of Search ........................ 399/49, 51; 347/130, 347/131, 132, 240, 251–54; 358/526, 298

[56] References Cited

U.S. PATENT DOCUMENTS

| | | | |
|---|---|---|---|
| 5,189,441 | 2/1993 | Fukui et al. .............................. | 347/253 |
| 5,309,177 | 5/1994 | Sho .......................................... | 347/131 |
| 5,666,150 | 9/1997 | Ajewole ................................... | 347/240 |

FOREIGN PATENT DOCUMENTS 5-127477  5/1993  Japan .

*Primary Examiner*—Joan Pendegrass
*Attorney, Agent, or Firm*—Armstrong, Westerman, Hattori, McLeland & Naughton

[57] ABSTRACT

An image forming apparatus includes an exposure unit forming a latent image using a light from a light source, a developing unit forming a toner image by visualizing the latent image using a toner, a detector outputting a detection signal by optically detecting an amount of toner of the toner image, a memory storing an optimum value of the detection signal output from the detector with respect to a light emission time of the light source, with respect to a plurality of light emission times of the light source to thereby store a plurality optimum values, and a control unit controlling the light emission time of the light source by calculating a light emission time corresponding to a value of the detection signal output from the detector based on the plurality of light emission times stored in the memory.

20 Claims, 11 Drawing Sheets

FIG.9

| COLOR \ LED LIGHT EMISSION TIME [μs] | 4 | 7 | 10 | 13 |
|---|---|---|---|---|
| Y | V#4Y | V#7Y | V#10Y | V#13Y |
| M | V#4M | V#7M | V#10M | V#13M |
| C | V#4C | V#7C | V#10C | V#13C |
| K | V#4K | V#7K | V#10K | V#13K |
| | ↓ | ↓ | ↓ | ↓ |
| | V#4 | V#7 | V#10 | V#13 |

IMAGE FORMING APPARATUS WITH IMAGE TONE ADJUSTING FUNCTION

BACKGROUND OF THE INVENTION

The present invention generally relates to image forming apparatuses, and more particularly to an image forming apparatus capable of adjusting a tone of an image formed on a surface of a recording medium.

Recently, due to improved performances of information processing apparatuses, there are demands to improve the performance of image forming apparatuses such as printers. An image forming apparatus capable of forming an image having a gradation representation on a recording medium such as paper has been developed to satisfy such demands.

Conventionally, image forming apparatuses capable of forming monochrome or color images having the gradation representation on the recording medium have been proposed. Particularly in the case of a color image, if the tone of each color is different from a corresponding designed value, the quality of the image formed on the recording medium greatly deteriorates. Hence, a method has been proposed to control a density of a toner image by detecting the density of the toner image and feeding back the detected density to an image forming part. According to this proposed method, an optimum value of the density of the toner image with respect to a certain image tone data is set in advance, and an amount of error of the density of the toner image which is actually formed from the optimum value is obtained based on this certain image tone data. When forming the image thereafter, the amount of error is added to the image tone data as an offset value, so as to correct inconsistencies in image forming characteristic of each of the individual image forming parts.

However, the amount of error of the density of the toner image which is actually formed from the optimum value is not constant and differs depending on the tone. For this reason, according to the proposed method which adds a constant offset value to the image tone data, there was a problem in that it is impossible to accurately reproduce all tones.

In the case of a monochrome image, even if the density of the toner image is slightly deviated from the designed value, this deviation is not conspicuous in the image which is formed on the recording medium. But in the case of the color image, even if the density of the toner image of one color deviates from the designed value, the color in the image which is formed on the recording medium becomes unnatural, thereby greatly deteriorating the quality of the image.

SUMMARY OF THE INVENTION

Accordingly, it is a general object of the present invention to provide a novel and useful image forming apparatus in which the problems described above are eliminated.

Another and more specific object of the present invention is to provide an image forming apparatus which can accurately control a tone of an image formed on a recording medium, by use of a relatively simple construction.

Still another object of the present invention is to provide an image forming apparatus comprising an exposure unit forming a latent image using a light from a light source, a developing unit forming a toner image by visualizing the latent image using a toner, a detector outputting a detection signal by optically detecting an amount of toner of the toner image, a memory storing an optimum value of the detection signal output from the detector with respect to a light emission time of the light source, with respect to a plurality of light emission times of the light source to thereby store a plurality optimum values, and a control unit controlling the light emission time of the light source by calculating a light emission time corresponding to a value of the detection signal output from the detector based on the plurality of light emission times stored in the memory. According to the image forming apparatus of the present invention, it is possible to accurately control the tone of the image formed on a recording medium using a relatively simple construction.

Other objects and further features of the present invention will be apparent from the following detailed description when read in conjunction with the accompanying drawings.

BRIEF DESCRIPTION OF THE DRAWINGS

FIG. 9 is a diagram showing LED light emission times which are provisionally set by processes of steps S11 through S15 shown in FIG. 5;

DESCRIPTION OF THE PREFERRED EMBODIMENTS

Figure 1:
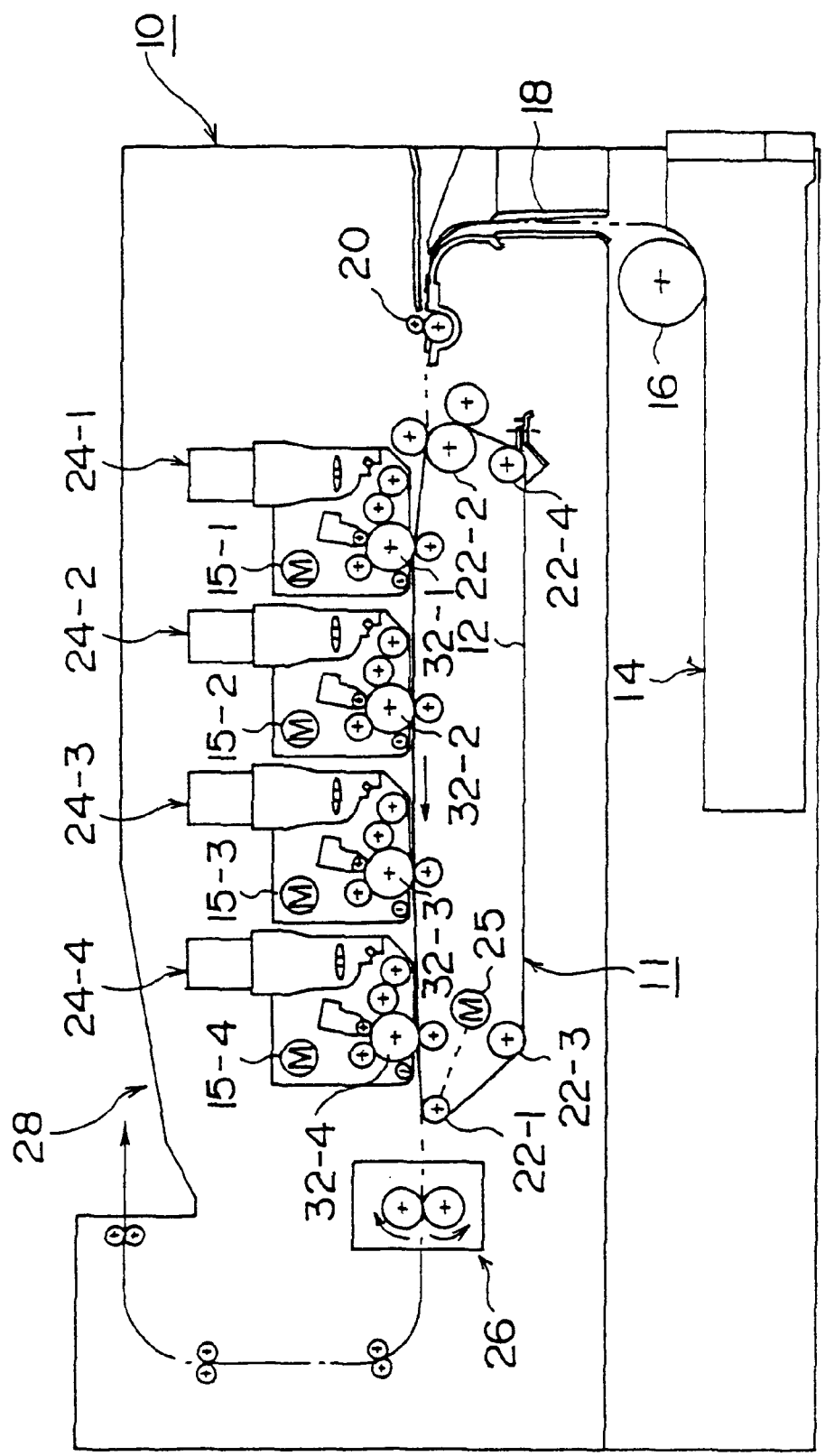
FIG. 1 is a cross sectional view showing an internal structure of an embodiment of an image forming apparatus according to the present invention.

FIG. 1 is a cross sectional view showing an internal structure of an embodiment of an image forming apparatus according to the present invention. In FIG. 1, a transport belt unit 11 for transporting a recording medium is provided within a main apparatus body 10, and a recording medium such as recording paper is transported by the transport belt unit 11. An endless belt 12 is provided in the transport belt unit 11 in a state free to turn in a direction indicated by an arrow. This endless belt 12 is made of a dielectric material having a light transmitting characteristic, such as a suitable synthetic resin, for example. The endless belt 12 is provided around four rollers 22-1 through 22-4. The transport belt unit 11 is detachably mounted with respect to the main apparatus body 10.

The roller 22-1 functions as a driving roller. This driving roller 22-1 is linked to a belt driving motor 25 via a gear train (not shown), and drives the endless belt 12 at a constant speed in a clockwise direction indicated by the arrow in FIG. 1. In addition, the roller 22-1 also functions as an A.C. discharge roller for eliminating a charge from the endless belt 12. The roller 22-2 functions as a following roller. The roller 22-2 also functions as a charging roller for applying a charge on the endless belt 12.

The rollers 22-3 and 22-4 function as guide rollers, and are respectively arranged in vicinities of the driving roller 22-1 and the following roller 22-2. An upper moving part of the endless belt 12 between the following roller 22-2 and the driving roller 22-1 forms a moving path of a recording medium. The recording media are stacked on a hopper 14, and the recording media are picked up by a pickup roller 16 and supplied one by one from the uppermost recording medium stacked on the hopper 14. The recording medium passes through a guide path 18, and is supplied by a pair of feed rollers 20 to the recording medium moving path of the endless belt 12 from an end of the endless belt 12 provided with the following roller 22-2. Further, the recording medium which passes the recording medium moving path is ejected via the driving roller 22-1.

Because the endless belt 12 is charged by the following roller 22-2, the recording medium is electrostatically attracted to the endless belt 12 when the recording medium is supplied via the following roller 22-2 to the recording medium moving path, thereby preventing a positional error of the moving recording medium. On the other hand, since the driving roller 22-1 on the ejecting side functions as the discharge roller, the charge of the endless belt 12 is eliminated at the part making contact with the driving roller 22-1. For this reason, the charge of the recording medium is eliminated when the recording medium passes the driving roller 22-1, and the recording medium easily separates from the endless belt 12 and is ejected without being pulled towards a lower moving part of the endless belt 12.

Four electrostatic recording units 24-1, 24-2, 24-3 and 24-4 respectively corresponding to the colors yellow (Y), magenta (M), cyan (C) and black (K) are provided within the main apparatus body 10. The electrostatic recording units 24-1, 24-2, 24-3 and 24-4 form a tandem structure such that the electrostatic recording units 24-1, 24-2, 24-3 and 24-4 are arranged in series in an order of the colors Y, M, C and K from the upstream side towards the downstream side along the recording medium moving path which is formed at the upper moving part of the endless belt 12 between the following roller 22-2 and the driving roller 22-1.

The electrostatic recording units 24-1, 24-2, 24-3 and 24-4 have the same construction except that developing agents including different colored toners are used. More particularly, the electrostatic recording units 24-1, 24-2, 24-3 and 24-4 respectively use a yellow toner component (Y), a magenta toner component (M), a cyan toner component (C) and a black toner component (K). Each of the electrostatic recording units 24-1, 24-2, 24-3 and 24-4 has a known construction including a light source which will be described later, an exposure unit for forming a latent image on a corresponding one of photoconductive drums 32-1 through 32-4, and a developing unit for forming a toner image on the corresponding one of the photoconductive drums 32-1 through 32-4. The toner within each developing unit may be accommodated in an independently replaceable toner cartridge.

Accordingly, the electrostatic recording units 24-1, 24-2, 24-3 and 24-4 successively transfer and record a yellow toner image, a magenta toner image, a cyan toner image and a black toner image in an overlapping manner on the recording medium which moves along the recording medium moving path located at the upper moving part of endless belt 12, thereby forming a full color image. The electrostatic recording units 24-1, 24-2, 24-3 and 24-4 are provided with the photoconductive drums 32-1 through 32-4, respectively. During a recording operation, the photoconductive drums 32-1 through 32-4 are driven by corresponding drum motors 15-1 through 15-4 which are respectively linked to the photoconductive drums 32-1 through 32-4 via gear trains (not shown), and each of the photoconductive drums 32-1 through 32-4 rotates at a constant speed in the clockwise direction.

When the recording medium passes the recording medium moving path of the endless belt 12 between the following roller 22-2 and the driving roller 22-1, the yellow, magenta, cyan and black toner images are successively transferred in the overlapping manner by the electrostatic recording units 24-1, 24-2, 24-3 and 24-4, and the full color image is formed on the recording medium. The recording medium is thereafter supplied towards a heat roller type thermal fixing unit 26 via the driving roller 22-1, and the full color image on the recording medium is thermally fixed. The recording medium subjected to the thermal fixing passes guide rollers and is ejected to be successively stacked on the stacker 28 which is provided at the upper part of the main apparatus body 10.

Figure 2:
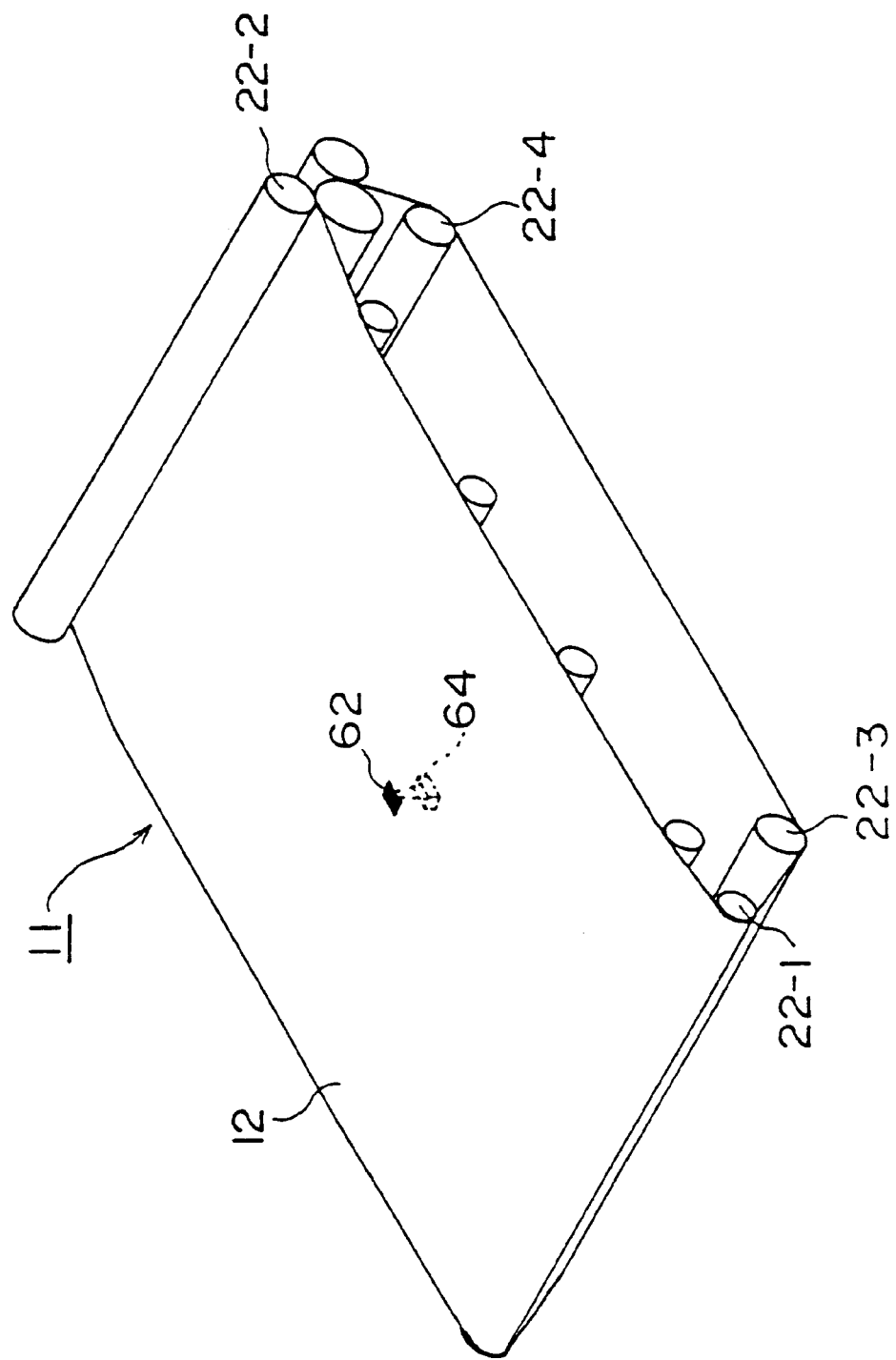
FIG. 2 is a perspective view for explaining a reflection type tone sensor which is provided with respect to an endless belt.

FIG. 2 is a perspective view for explaining a reflection type tone sensor 64 which is provided with respect to the endless belt 12 of the transport belt unit 11. The reflection type tone sensor 64 is arranged at a position such that each of markers 62 formed on a front surface of the endless belt 12 by the electrostatic recording units 24-1 through 24-4 is detectable from a back surface side of the endless belt 12. The reflection type tone sensor 64 includes a light emitting element and a light receiving element, and the light receiving element detects a light emitted from the light emitting element and reflected by each marker 62 as each marker 62 passes a detecting position. Based on an intensity of the detected reflected light, the light receiving element outputs a detection signal which indicates an amount of toner forming each marker 62 that is detected. The amount of toner that is detected is an amount of toner adhered on the recording medium or, a toner density.

Of course, the reflection type tone sensor 64 may be arranged at a position such that each marker 62 formed on the front surface of the endless belt 12 is detectable from the front surface side of the endless belt 12. In addition, the location of the reflection type tone sensor 64 with respect to the endless belt 12 is of course not limited to the central portion of the endless belt 12 as in the case shown in FIG. 2.

Figure 3:
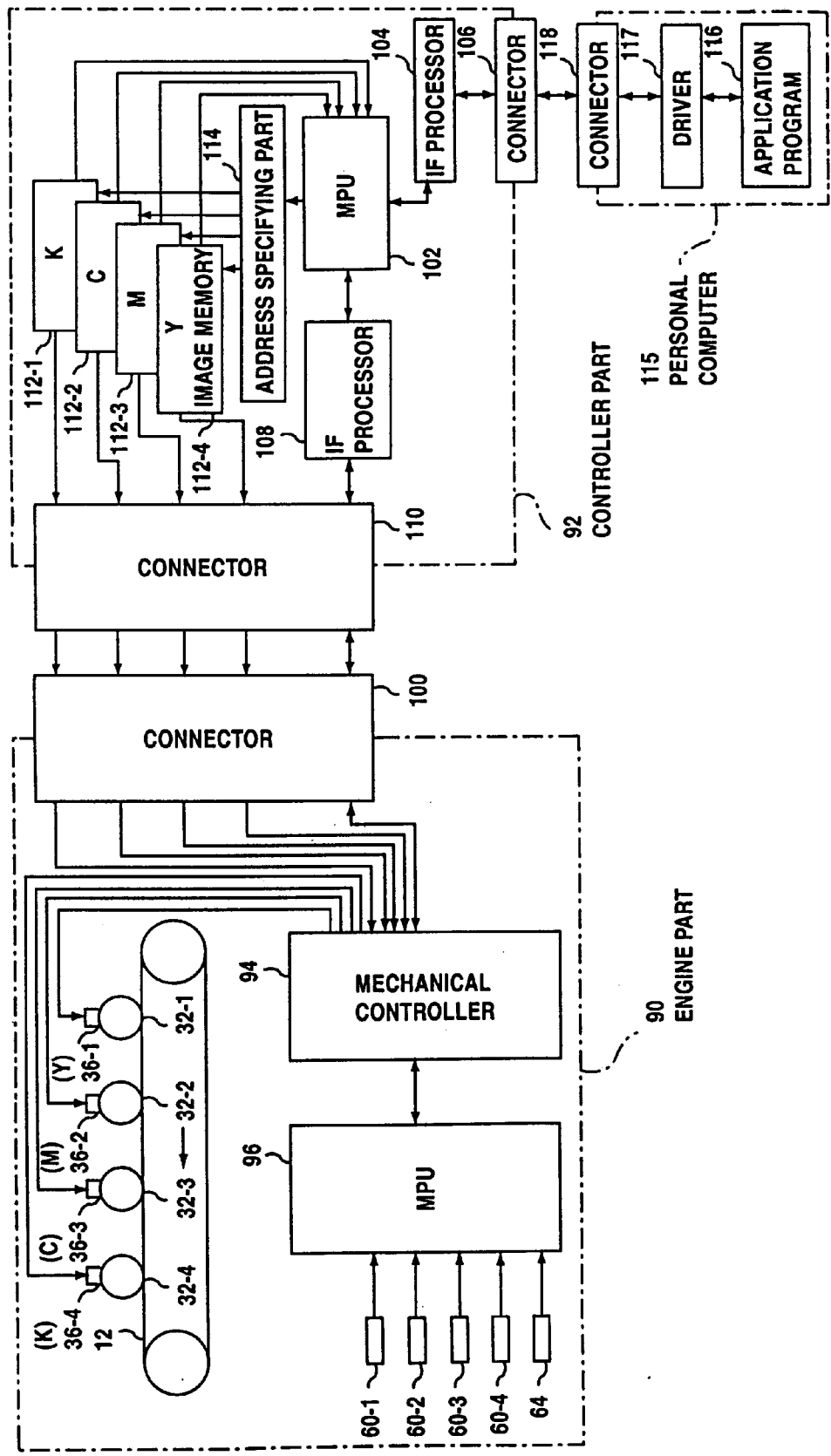
FIG. 3 is a system block diagram showing the construction of a control system of the image forming apparatus shown in FIG. 1.

FIG. 3 is a system block diagram showing the construction of a control system of the image forming apparatus shown in FIG. 1. In FIG. 3, the control system includes an engine part 90 and a controller part 92. The engine part 90 includes the transport belt unit 11 shown in FIG. 2, and a mechanical controller 94 which controls the electrostatic recording units 24-1 through 24-4. The mechanical controller 94 is coupled to microprocessor unit (MPU) 96 for processing outputs of sensors. The MPU 96 receives detection signals from the reflection type tone sensor 64 and sensor groups 60-1 through 60-4. The sensor group 60-1 detects the repair or replacement of light emitting diode (LED) arrays 36-1 through 36-4 which form the light sources of the corresponding electrostatic recording units 24-1 through 24-4. The sensor group 60-2 detects the repair or replacement of the exposure units of the electrostatic recording units 24-1 through 24-4 or the replacement of the toner cartridges within the exposure units. The sensor group 60-3 detects the repair or replacement of the developing units of the electrostatic recording units 24-1 through 24-4. The sensor group 60-4 detects a total number of recording media printed or the total print operation time of the image forming apparatus.

The MPU 96 also receives output signals of sensors or the like which detect rotary positions of the photoconductive drums 32-1 through 32-4 within the electrostatic recording units 24-1 through 24-4, for example, but illustrations of such sensors will be omitted since such sensors are not directly related to the subject matter of the present invention. The signals from the various sensors including the reflection type tone sensor 64 and the sensor groups 60-1 through 60-4 are actually input to the MPU 96 after being converted into digital signals by analog-to-digital converters (not shown).

The mechanical controller 94 is coupled to the controller part 92 via an engine part connector 100. For the sake of convenience, not all of the printing mechanism provided within the engine part 90 are shown in FIG. 3. FIG. 3 only shows the endless belt 12, and the LED arrays 36-1 through 36-4 and the photoconductive drums 32-1 through 32-1 provided within the electrostatic recording units 24-1 through 24-4.

A controller MPU 102 is provided in the controller part 92. This controller MPU 102 is coupled to a personal computer 115 which is provided as a host unit, via an interface processor 104 and a controller part connector 106. The personal computer 115 is provided with a driver 117 for carrying out a print process with respect to a color image data based on a print instruction provided from an arbitrary application program 116. The driver 117 is coupled to the controller part connector 106 of the controller part 92 via a computer connector 118.

Image memories 112-1 through 112-4 are provided with respect to the controller MPU 102 of the controller part 92. The image data of each of the colors yellow, magenta, cyan and black transferred from the personal computer 115 are developed into pixel data (dot data) and stored in the image memories 112-1 through 112-4. In addition, the controller MPU 102 is coupled to the engine part 90 via an interface processor 108 and a controller connector 110. The controller MPU 102 supplies the print instruction to the engine part 90, and receives control commands such as a print preparations complete from the engine part 90 in response to the print instruction, so as to carry out a print control.

The controller MPU 102 is coupled to an address specifying part 114 which specifies an address when developing the color pixel data in the image memories 112-1 through 112-4. This address specifying part 114 also specifies a read address at the time of the print operation when adding to each of the color pixel data developed in the image memories 112-1 through 112-4 the LED light emission times by the mechanical controller 94 of the engine part 90 so as to read and transfer one line at a time in units of a main scan direction of the LED arrays 36-1 through 36-4. The main scan direction of the LED arrays 36-1 through 36-4 is perpendicular to a belt transport direction in which the upper moving part of the endless belt 12 moves.

For example, the resolution of each of the color pixel data developed in the image memories 112-1 through 112-4 is 600 dpi in the main scan direction of the LED arrays 36-1 through 36-4, and is 1800 dpi in a sub scan direction which is parallel to the belt transport direction.

Figure 4:
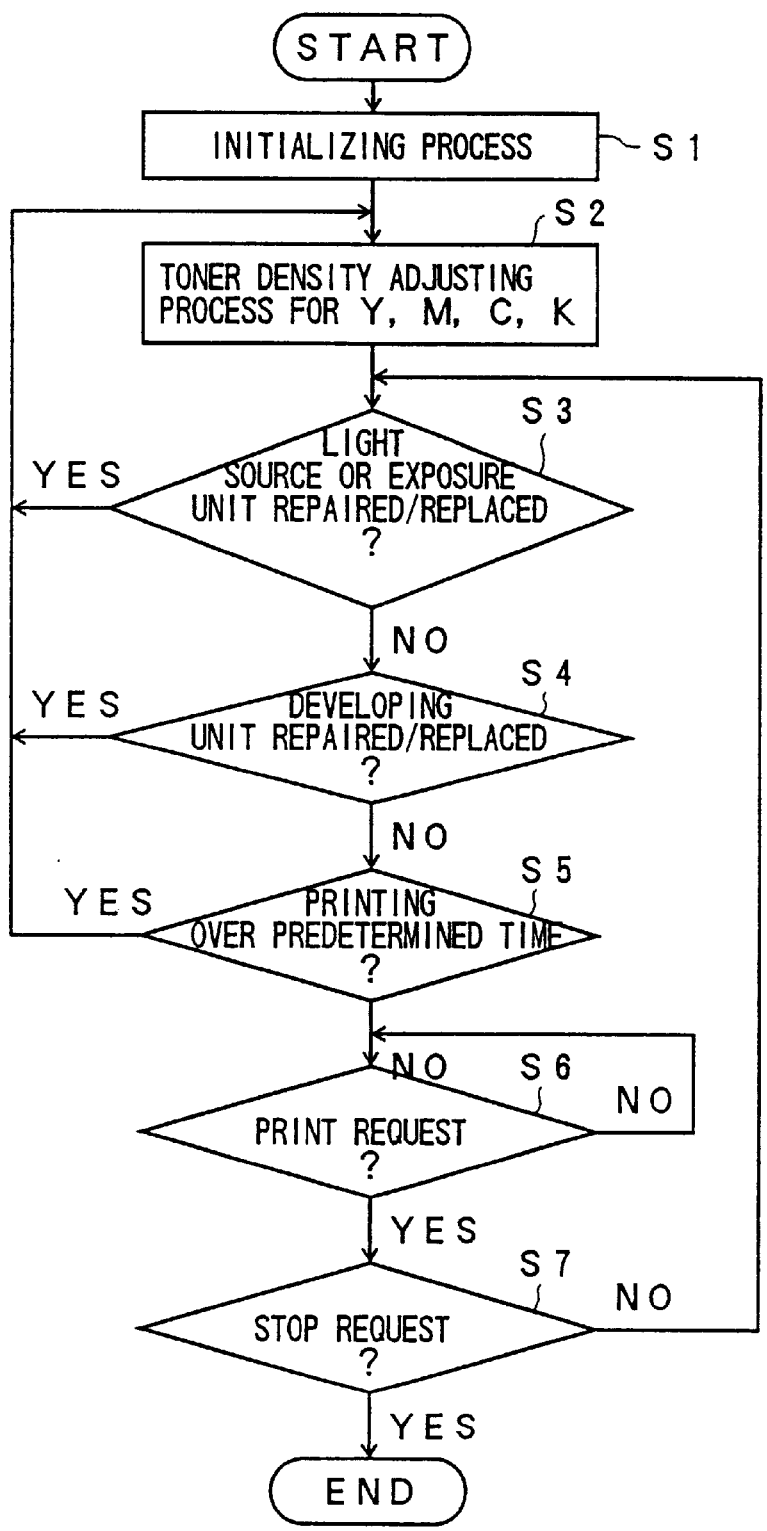
FIG. 4 is a flow chart for explaining a general print operation of the embodiment.

FIG. 4 is a flow chart for explaining a general print operation of this embodiment. IN FIG. 4, when the power of the image forming apparatus is turned ON, a step S1 carries out an initializing process, and a step S2 carries out a toner density adjusting process with respect to each of the colors yellow, magenta, cyan and black. A step S3 decides whether or not at least one of the LED arrays 36-1 through 36-4 or at least one of the exposure units is repaired or replaced, based on the detection signals from the sensor groups 60-1 and 60-2, and the process returns to the step S2 if the decision result in the step S3 is YES. On the other hand, if the decision result in the step S3 is NO, a step S4 decides whether or not at least one of the developing units is repaired or replaced, based on the detection signals from the sensor group 60-3, and the process returns to the step S2 if the decision result in the step S4 is YES. If the decision result in the step S4 is NO, a step S5 decides whether or not the total number of recording media printed or the total print operation time of the image forming apparatus reached a predetermined value, based on the detection signals from the sensor group 60-4, and the process returns to the step S2 if the decision result in the step S4 is YES. The step S5 may decide whether or not the total print operation time of the image forming apparatus reached the predetermined value based on a time measured by a timer within mechanical controller 94 or the controller MPU 102.

If the decision result in the step S5 is NO, a step S6 decides whether or not a print request from the personal computer 115 is input, and the step S6 is repeated until the decision result becomes YES. When the decision result in the step S6 becomes YES, a step S7 decides whether or not a stop request is input from the personal computer 115, and the process returns to the step S3 if the decision result in the step S7 is NO. On the other hand, the process ends if the decision result in the step S7 is YES.

Figure 5:
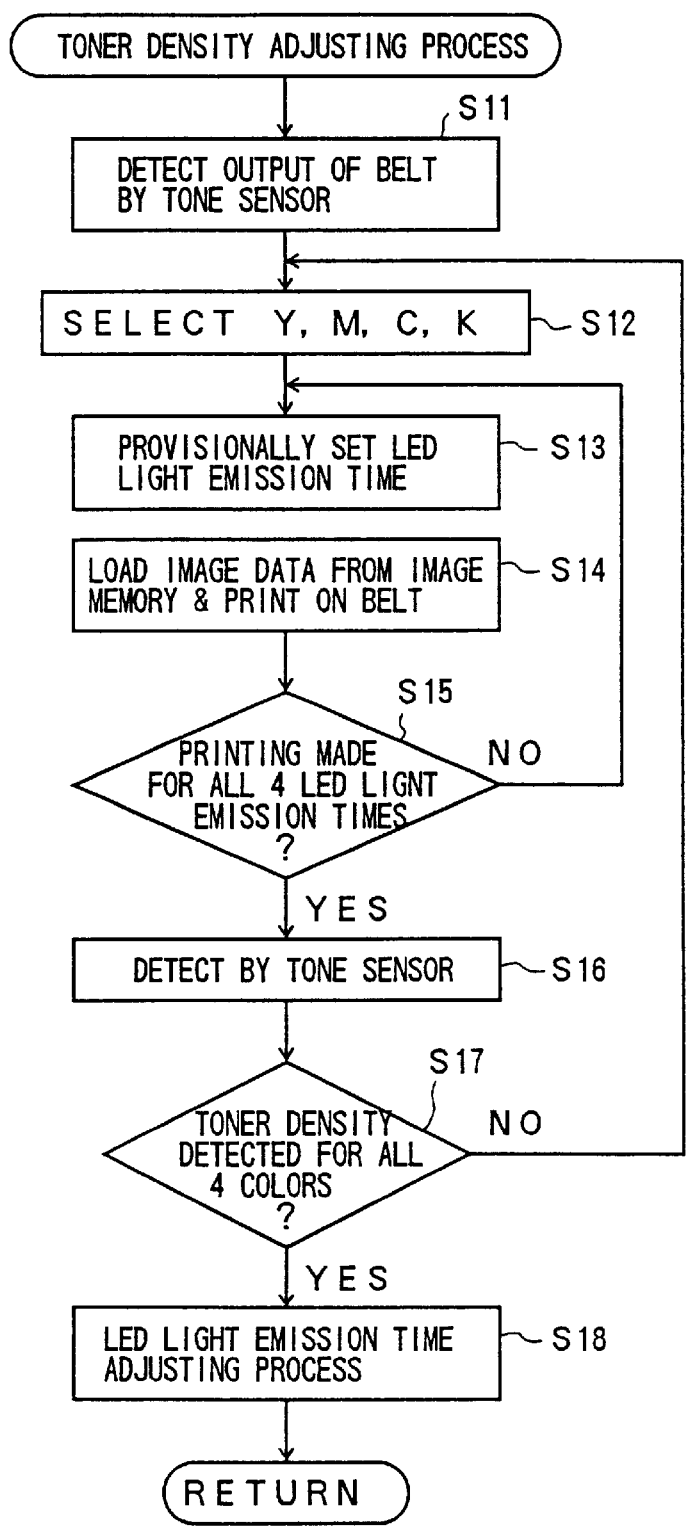
FIG. 5 is a flow chart for explaining a toner density adjusting process.

FIG. 5 is a flow chart for explaining the toner density adjusting process. The toner density adjusting process shown in FIG. 5 corresponds to the step S2 shown in FIG. 4. This toner density adjusting process is carried out by at least one of the MPU 96, the mechanical controller 94 and the controller MPU 102 shown in FIG. 3.

Figure 6:
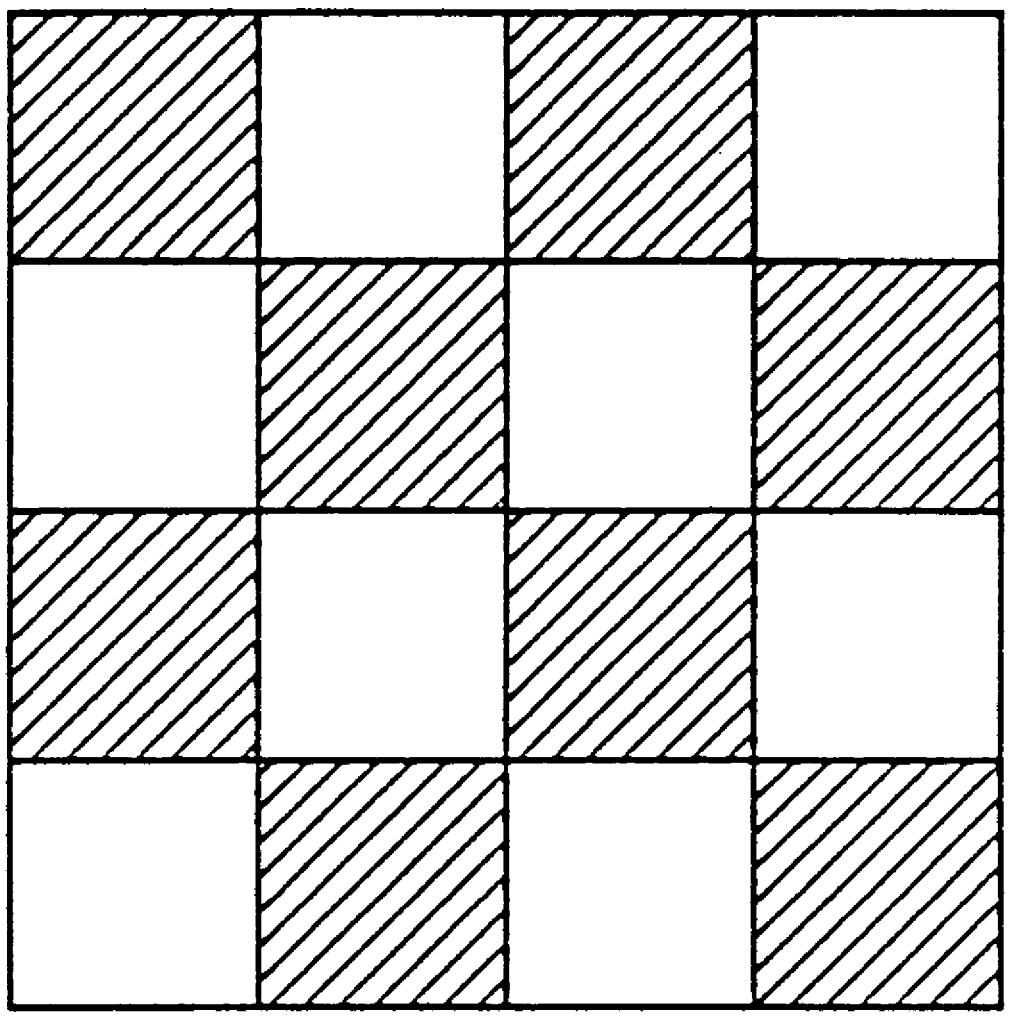
FIG. 6 is a diagram showing a printing pattern indicating tone adjusting pixel data.

In FIG. 5, a step S11 inputs detection signals indicating the amounts of the toners forming the markers 62 of each of the colors yellow, magenta, cyan and black detected by the reflection type tone sensor 64. A step S12 selects one of the colors yellow, magenta, cyan and black for which the toner density is to be adjusted. In this embodiment, it is assumed for the sake of convenience that the color for which the toner density is to be adjusted is successively selected in the order of yellow, magenta, cyan and black. A step S13 provisionally sets the light emission time of tone of the LED arrays 36-1 through 36-4 corresponding to the selected color, based on the detection signal received from the reflection type tone sensor 64. In this embodiment, the light emission time of one of the LED arrays 36-1 through 36-4 corresponding to the selected color is successively and provisionally set to four kinds of times which are 4 $\mu$s, 7 $\mu$s, 10 $\mu$s and 13 $\mu$s. A step S14 reads a tone adjusting pixel data which indicates a printing pattern shown in FIG. 6 and is developed in one of the image memories 112-1 through 112-4 corresponding to the selected color, and supplies the tone adjusting pixel data to one of the electrostatic recording units 24-1 through 24-4 corresponding to the selected color. As a result, the marker 62 is printed on the endless belt 12 with the provisionally set times using the selected color. In FIG. 6, printing regions which are arranged in a checker-board pattern are indicated by the hatching. One pixel is printed within one hatched printing region in FIG. 6, and each region without the hatching indicates a non-printing region. A step S15 decides whether or not the printing is carried out using all of the four provisionally set light emission times, and the process returns to the step S13 if the decision result in the step S15 is NO.

The printing pattern indicated by the tone adjusting pixel data is of course not limited to the printing pattern shown in FIG. 6. However, it is desirable from the point of view of accurately detecting the toner density that the tone adjusting pixel data indicates a printing pattern other than a maximum tone which involves solid printing all over. In this embodiment, the same printing pattern is printed for each of the colors yellow, magenta, cyan and black, so as to detect the toner density of each of the colors yellow, magenta, cyan and black.

Figure 7A:
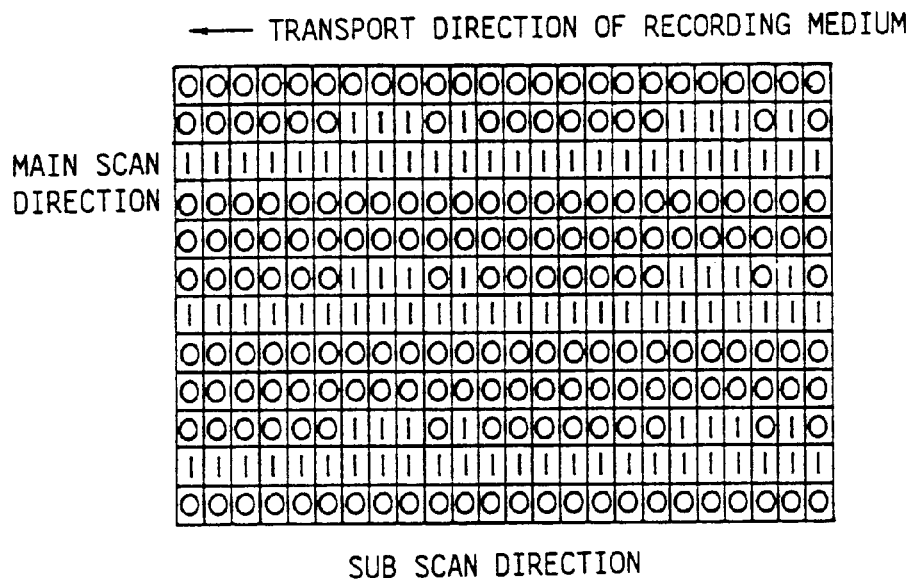
FIGS. 7A and 7B respectively are diagrams for explaining a print pattern developed in an image memory and a pattern printed on the endless belt.
Figure 7B:
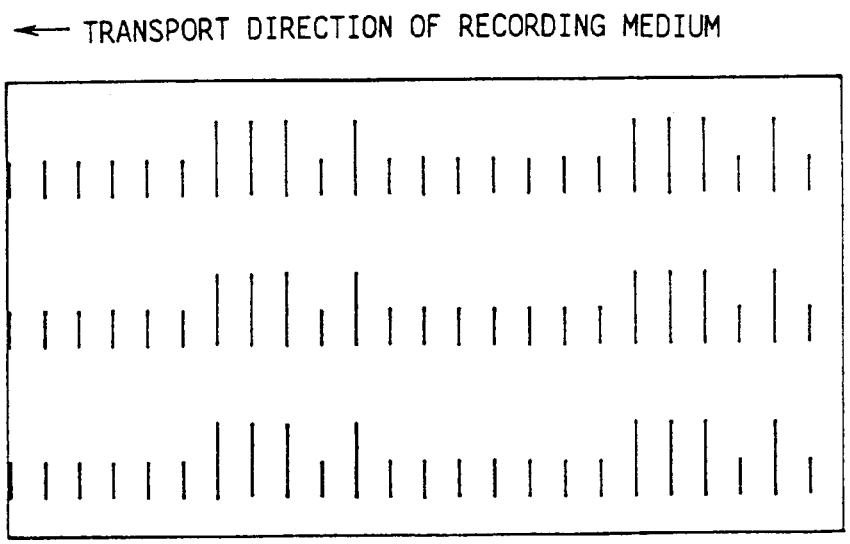
Figure 8A:
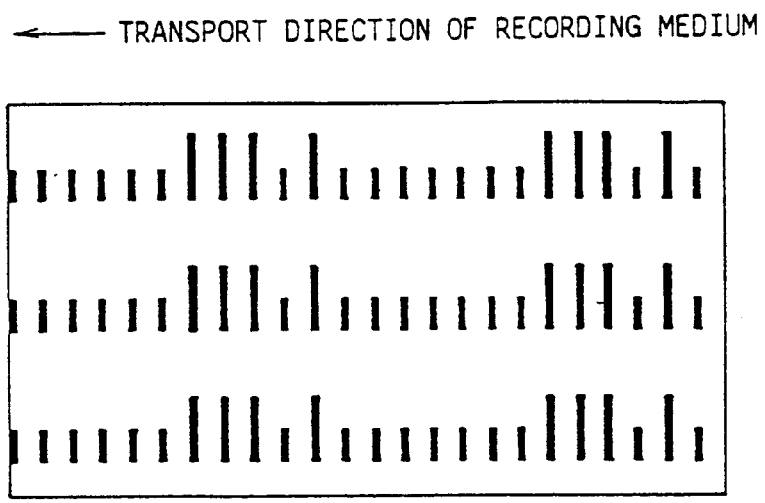
FIGS. 8A through 8C respectively are diagrams for explaining patterns printed on the endless belt as a light emission time of a light emitting diode (LED) increases.
Figure 8B:
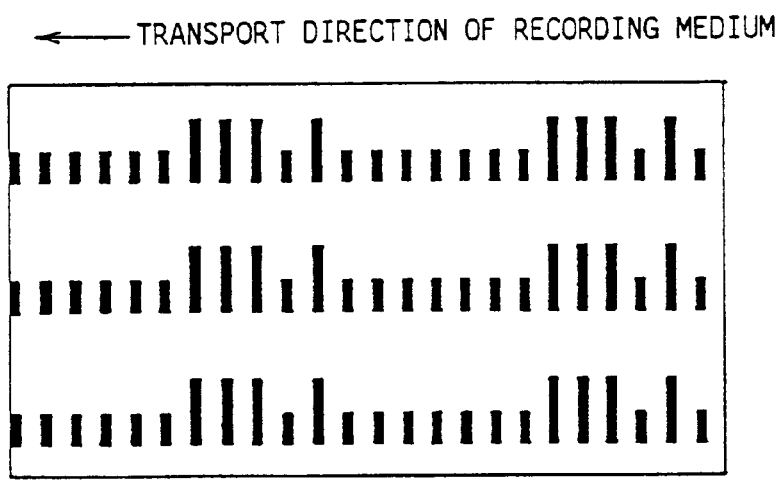
Figure 8C:
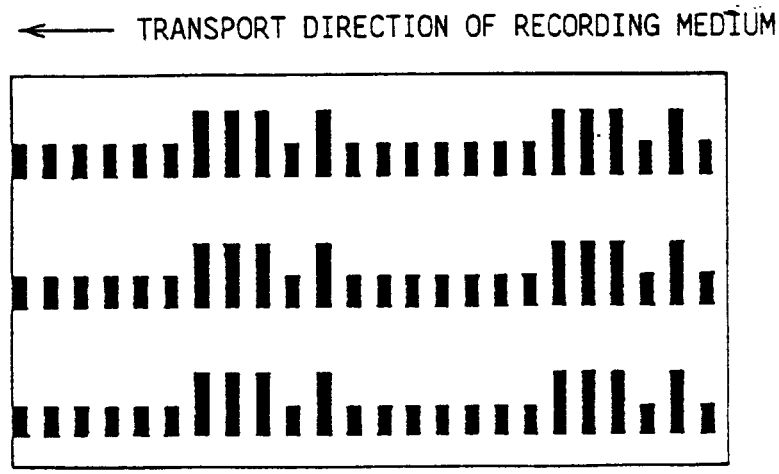

FIGS. 7A and 7B are diagrams for explaining the printing pattern developed in the image memories 112-1 through 112-4 and the pattern printed on the endless belt 12. FIG. 7A shows the printing pattern developed in the image memories 112-1 through 112-4, where "1" indicates a pixel that is printed and "0" indicates a pixel that is not printed. On the other hand, FIG. 7B shows the pattern printed on the endless belt 12 when the printing pattern shown in FIG. 7A is printed. The pattern shown in FIG. 7B changes as shown in FIGS. 8A, 8B and 8C as the corresponding LED light emission times increase.

If the decision result in the step S15 is YES, a step S16 detects the toner density of the marker 62 of the selected color for each of the provisionally set light emission times, based on the detection signal from the reflection type tone sensor 64. In addition, a step S17 decides whether or not the detection of the toner density is ended for each of the colors yellow, magenta, cyan and black, and the process returns to the step S12 if the decision result in the step S17 is NO. On the other hand, if the decision result in the step S17 is YES, a step S18 carries out a LED light emission time adjusting process with respect to each of the LED arrays 36-1 through 36-4, and the process ends.

FIG. 9 is a diagram showing the LED light emission times which are provisionally set by the steps S11 through S15 shown in FIG. 5. In FIG. 9, with respect to the color yellow, for example, optimum values $V_{\#4Y}$, $V_{\#7Y}$, $V_{\#10Y}$ and $V_{\#13Y}$ are respectively set with respect to the light emission times 4 $\mu$s, 7 $\mu$s, 10 $\mu$s and 13 $\mu$s of the LED arrays 36-1 through 36-4. For example, the optimum values shown in FIG. 9 including the optimum values $V_{\#4Y}$, $V_{\#7Y}$, $V_{\#10Y}$ and $V_{\#13Y}$ described above are stored in an internal memory of the MPU 96 or the image memories 112-1 through 112-4. In this embodiment, the optimum values shown in FIG. 9 indicate detection signal voltages from the reflection type tone sensor 64 corresponding to the LED light emission times.

Figure 10:
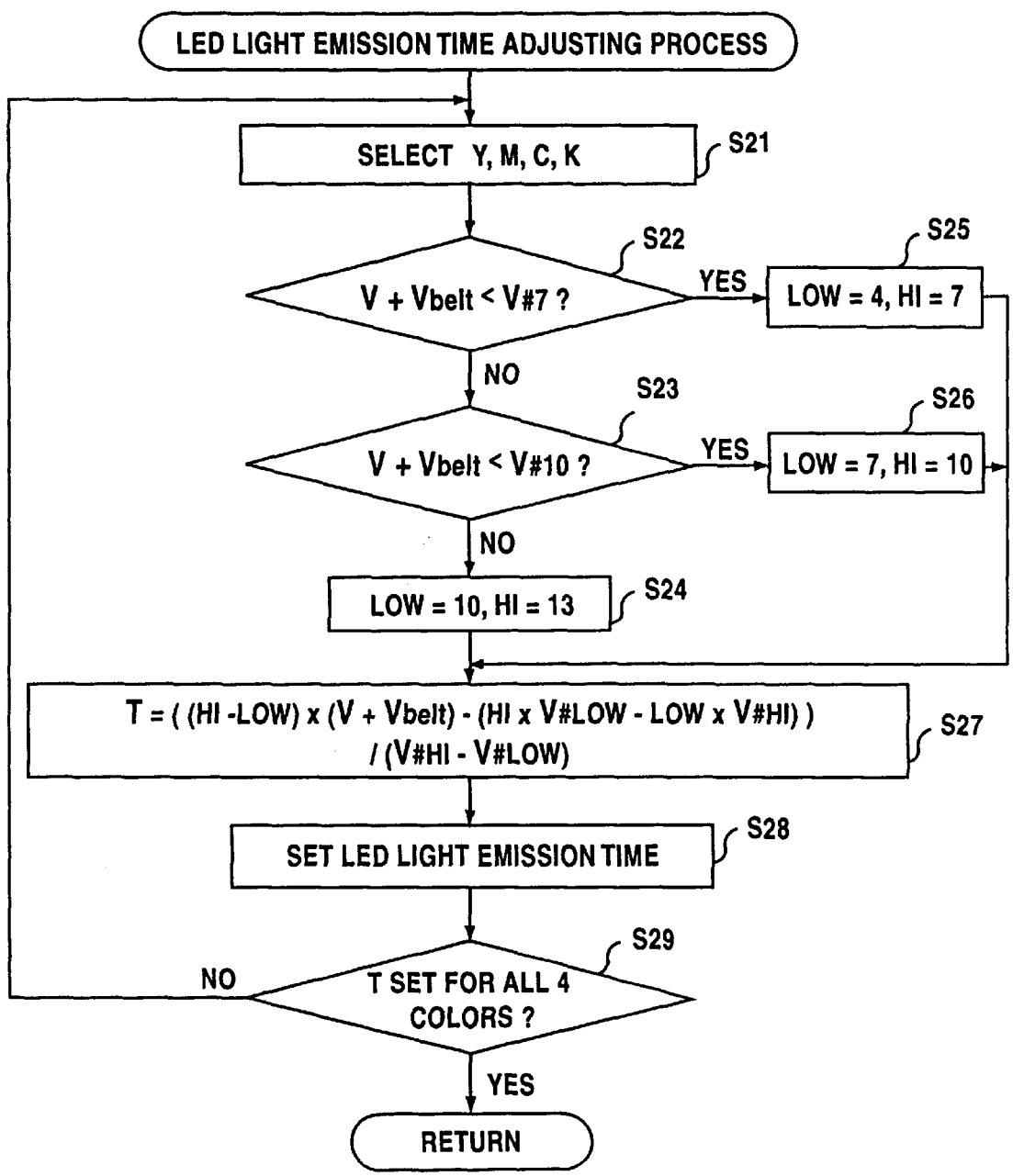
FIG. 10 is a flow chart for explaining a LED light emission time adjusting process.

FIG. 10 is a flow chart for explaining the LED light emission time adjusting process. The LED light emission time adjusting process shown in FIG. 10 corresponds to the step S18 shown in FIG. 5. This LED light emission time adjusting process is carried out by at least one of the MPU 96, the mechanical controller 94 and the controller MPU 102 shown in FIG. 3.

In FIG. 10, a step S21 selects one of the colors yellow, magenta, cyan and black for which the LED light emission time adjusting process is to be carried out. In this embodiment, it is assumed for the sake of convenience that the color for which the LED light emission time is to be adjusted is successively selected in the order of yellow, magenta, cyan and black. A step S22 obtains a sum of a detection signal voltage V which is obtained from the reflection type tone sensor 64 when the marker 62 of the selected color is detected and a detection signal voltage $V_{belt}$ which is obtained from the reflection type tone sensor 64 when the endless belt 12 other than the marker 62 is detected, and decides whether or not this sum is less than or equal to the optimum value $V_{\#7Y}$ shown in FIG. 9. For example, when the selected color is yellow, the step S22 decides whether or not $V+V_{belt} \leq V_{\#7}$. If the decision result in the step S22 is NO, a step S23 decides whether or not $V+V_{belt} \leq V_{\#10}$. If the decision result in the step S23 is NO, a step S24 sets a smaller value Low to Low=10, and sets a larger value Hi to Hi=13.

On the other hand, if the decision result in the step S22 is YES, a step S25 sets the smaller value Low to Low=4, and sets the larger value Hi to Hi=7. In addition, if the decision result in the step S23 is YES, a step S26 sets the smaller value Low to Low=7, and sets the larger value Hi to Hi=10.

After the step S24, S25 or S26, a step S27 calculates a LED light emission time T for the selected color, based on the following formula.

$$T = \{(\text{Hi-Low}) \cdot (V+V_{belt}) - (\text{Hi} \cdot V_{\#Low} - \text{Low} \cdot V_{\#Hi})\} / (V_{\#Hi} - V_{\#Low})$$

A step S28 sets the LED light emission time T which is calculated in the step S27 with respect to the selected color. A step S29 decides whether or not the setting of the LED light emission time T is ended with respect to all of the four colors, and the process returns to the step S21 if the decision result in the step S29 is NO. On the other hand, the process ends if the decision result in the step S29 is YES.

Figure 11A:
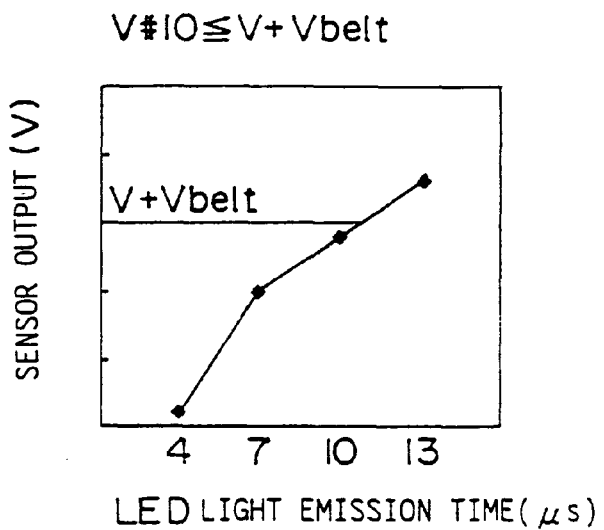
FIGS. 11A through 11C respectively are diagrams for explaining the LED light emission times set by the LED light emission time adjusting process.
Figure 11B:
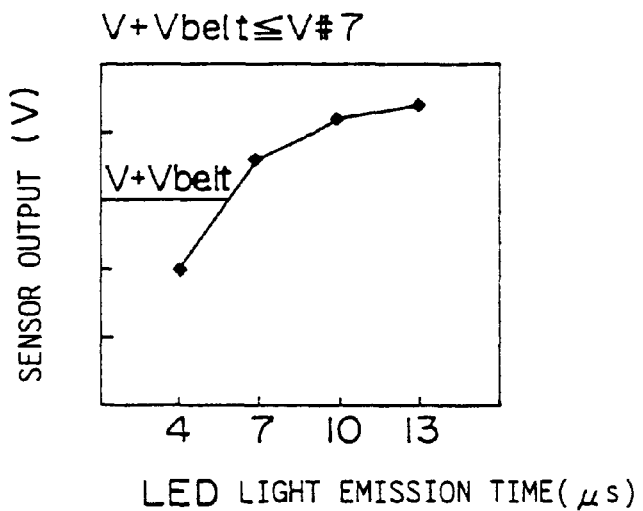
Figure 11C:
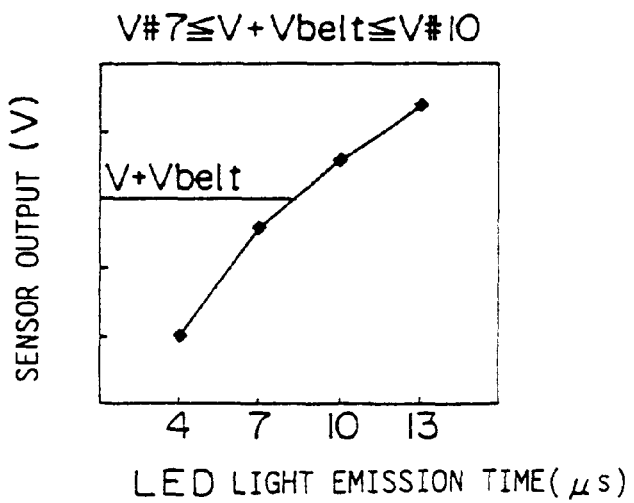

FIGS. 11A through 11C are diagrams for explaining the LED light emission time that is set by the LED light emission time adjusting process shown in FIG. 10. FIG. 11A is a diagram showing a case where the decision result in the step S23 shown in FIG. 10 is NO, and shows the setting of the LED light emission time by carrying out a linear interpolation in a section between the optimum values with respect to the LED light emission times of 10 $\mu$s and 13 $\mu$s shown in FIG. 9. FIG. 11B is a diagram showing a case where the decision result in the step S22 shown in FIG. 10 is YES, and shows the setting of the LED light emission time by carrying out a linear interpolation in a section between the optimum values with respect to the LED light emission times of 4 $\mu$s and 7 $\mu$s shown in FIG. 9. Similarly, FIG. 11C is a diagram showing a case where the decision result in the step S23 shown in FIG. 10 is YES, and shows the setting of the LED light emission time by carrying out a linear interpolation in a section between the optimum values with respect to the LED light emission times of 7 $\mu$s and 10 $\mu$s shown in FIG. 9. Of course, the interpolation carried out in the section between two optimum values is not limited to the linear interpolation, however, the required computing process becomes simple in the case of the linear interpolation.

Further, the present invention is not limited to these embodiments, but various variations and modifications may be made without departing from the scope of the present invention.

What is claimed is:

1. An image forming apparatus comprising:

an exposure unit forming a latent image using a light from a light source;

a developing unit forming a toner image by visualizing the latent image using a toner;

a detector outputting a detection signal by optically detecting an amount of toner of the toner image;

a memory storing an optimum value of the detection signal output from said detector with respect to a light emission time of the light source, with respect to a plurality of light emission times of the light source to thereby store a plurality optimum values; and a control unit controlling the light emission time of the light source by calculating a light emission time corresponding to a value of the detection signal output from said detector based on the plurality of light emission times stored in said memory.

2. The image forming apparatus as claimed in claim 1, wherein said control unit controls said exposure unit and said developing unit, and said control unit also obtains in advance and stores in said memory optimum values which are obtained based on the detection signal output from said detector with respect to toner images of the same pattern excluding a maximum tone.

3. The image forming apparatus as claimed in claim 2, wherein the toner images of the same pattern excluding the maximum tone are related to a checker-board pattern.

4. The image forming apparatus as claimed in claim 2, wherein a timing at which said control unit obtains and stores the optimum values in said memory is selected from a group of times consisting of a time when a power of the image forming apparatus is turned ON, a time when at least one of the light source, said exposure unit and said developing unit is repaired or replaced, a time when a total number of images formed by the image forming apparatus reaches a predetermined value, and a time when a total time of the image forming apparatus used reaches a predetermined value.

5. The image forming apparatus as claimed in claim 1, wherein a timing at which said control unit obtains and stores the optimum values in said memory is selected from a group of times consisting of a time when a power of the image forming apparatus is turned ON, a time when at least one of the light source, said exposure unit and said developing unit is repaired or replaced, a time when a total number of images formed by the image forming apparatus reaches a predetermined value, and a time when a total time of the image forming apparatus used reaches a predetermined value.

6. The image forming apparatus as claimed in claim 5, wherein said control unit controls the light emission time of the light source independently for each of a plurality of toner colors.

7. The image forming apparatus as claimed in claim 2, wherein said control unit controls the light emission time of the light source independently for each of a plurality of toner colors.

8. The image forming apparatus as claimed in claim 1, wherein said control unit controls the light emission time of the light source independently for each of a plurality of toner colors.

9. The image forming apparatus as claimed in claim 8, which further comprises:

a plurality of recording units each including a said light source, a said exposure unit and a said developing unit, said control unit independently controlling the light emission times of the light sources of the recording units.

10. The image forming apparatus as claimed in claim 5, which further comprises:

a plurality of recording units each including a said light source, a said exposure unit and a said developing unit, said control unit independently controlling the light emission times of the light sources of the recording units.

11. The image forming apparatus as claimed in claim 2, which further comprises:

a plurality of recording units each including a said light source, a said exposure unit and a said developing unit, said control unit independently controlling the light emission times of the light sources of the recording units.

12. The image forming apparatus as claimed in claim 1, which further comprises:

a plurality of recording units each including a said light source, a said exposure unit and a said developing unit, said control unit independently controlling the light emission times of the light sources of the recording units.

13. The image forming apparatus as claimed in claim 12, wherein said detector detects the amount of toner of the toner image formed on a transport belt which transports a recording medium having a surface on which the image is formed.

14. The image forming apparatus as claimed in claim 8, wherein said detector detects the amount of toner of the toner image formed on a transport belt which transports a recording medium having a surface on which the image is formed.

15. The image forming apparatus as claimed in claim 5, wherein said detector detects the amount of toner of the toner image formed on a transport belt which transports a recording medium having a surface on which the image is formed.

16. The image forming apparatus as claimed in claim 2, wherein said detector detects the amount of toner of the toner image formed on a transport belt which transports a recording medium having a surface on which the image is formed.

17. The image forming apparatus as claimed in claim 1, wherein said detector detects the amount of toner of the toner image formed on a transport belt which transports a recording medium having a surface on which the image is formed.

18. The image forming apparatus as claimed in claim 5, wherein the amount of toner is selected from an amount of toner adhered and a toner density.

19. The image forming apparatus as claimed in claim 2, wherein the amount of toner is selected from an amount of toner adhered and a toner density.

20. The image forming apparatus as claimed in claim 1, wherein the amount of toner is selected from an amount of toner adhered and a toner density.

* * * * *